March 15, 1932.  D. H. WEST  1,849,392
BROACH
Filed May 9, 1930  2 Sheets-Sheet 1
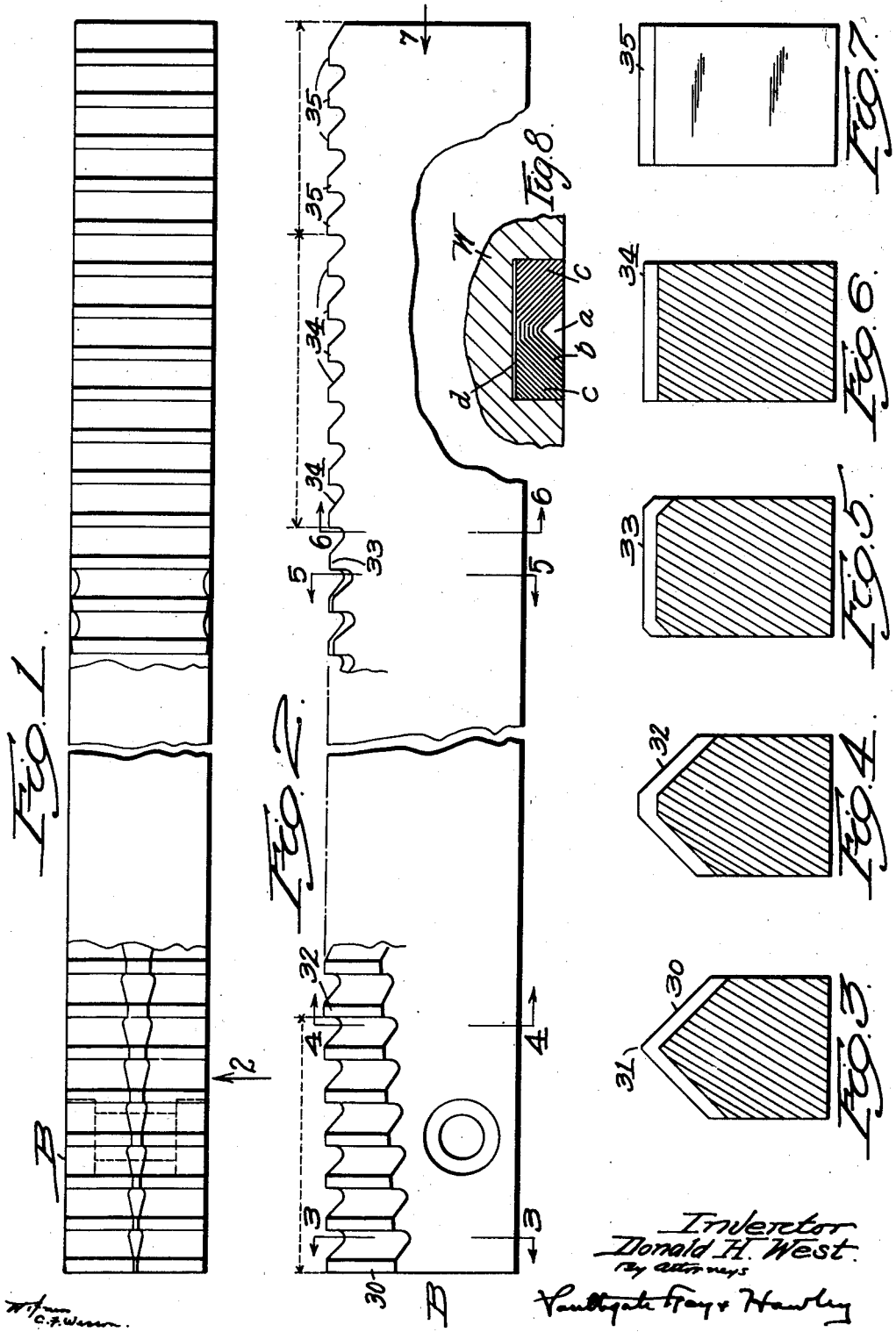

March 15, 1932.    D. H. WEST    1,849,392
BROACH
Filed May 9, 1930    2 Sheets-Sheet 2
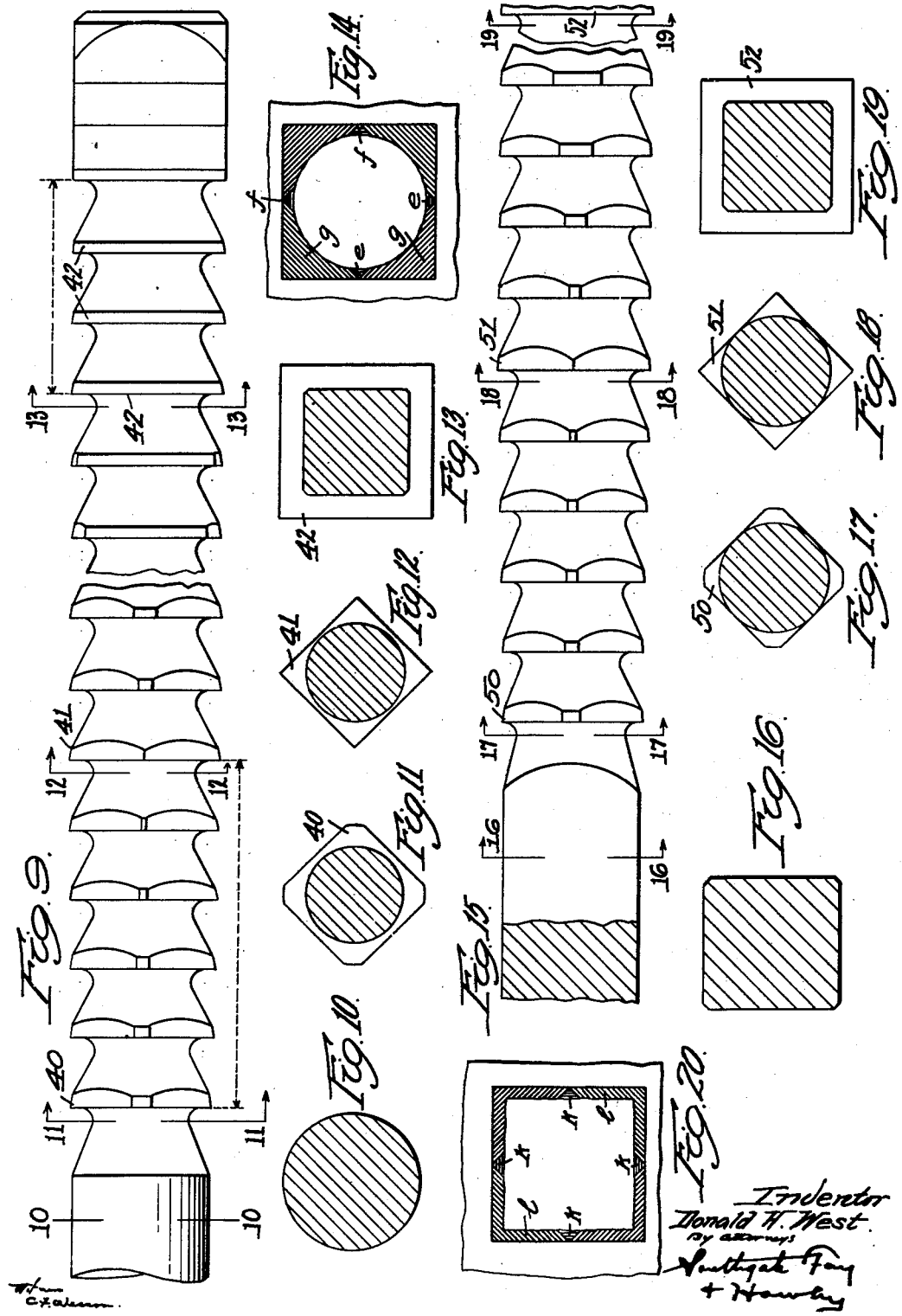

Patented Mar. 15, 1932

1,849,392

UNITED STATES PATENT OFFICE

DONALD H. WEST, OF MARLBORO, MASSACHUSETTS, ASSIGNOR TO THE LAPOINTE MACHINE TOOL COMPANY, OF HUDSON, MASSACHUSETTS, A CORPORATION OF MAINE

BROACH

Application filed May 9, 1930. Serial No. 451,178.

This invention relates to broaches for use in broaching recesses or openings in cast iron or other metals. In broaching recesses or enlarging cored holes, particularly in cast iron, the wall of the metal is usually found covered with a hard scale or chilled surface which is difficult to remove and which quickly dulls the edge of an ordinary tool.

It is the object of my invention to provide a broach having cutting teeth so designed and related that each tooth will cut entirely through the hard outer surface of the metal to the softer material behind the outer surface, thus preserving the cutting edges of the teeth.

A further object is to provide a broach in which successive teeth are shaped to remove narrow strips of stock at the sides of the cut rather than to remove successive wide layers of stock at the bottom of the cut.

My invention further relates to arrangements and combinations of parts which will be hereinafter described and more particularly pointed out in the appended claims.

Three forms of the invention are shown in the drawings in which

Fig. 1 is a plan view of one form of my improved broach;

Fig. 2 is a side elevation thereof;

Figs. 3 to 6 are sectional end elevations taken on the correspondingly numbered section lines in Fig. 2;

Fig. 7 is an end elevation of the broach, looking in the direction of the arrow 7 in Fig. 2;

Fig. 8 is a diagrammatic view indicating the relation of the different cuts;

Fig. 9 is a plan view of a broach for broaching a square hole from a round cored opening;

Figs. 10 to 13 are sectional end elevations taken along the correspondingly numbered section lines in Fig. 9;

Fig. 14 is a diagrammatic view illustrating the different cuts;

Fig. 15 is a plan view of a broach for enlarging a cored square opening;

Figs. 16 to 19 are sectional end elevations taken along correspondingly numbered section lines in Fig. 15, and Fig. 20 is a diagrammatic view showing the relation of the different cuts.

Referring particularly to Figs. 1 to 7, the broach therein shown is designed for broaching a recess or slot in the side or face of a piece of work W, as indicated in Fig. 8.

At the entering end of the broach B, the tooth 30 is formed with cutting edges disposed at substantial angles to the sides of the broach as indicated in Fig. 3. These angles may be varied but are indicated in the drawings as being about 45°.

The end tooth 30 has its cutting edges substantially meeting in a point as indicated at 31, the tooth being of such height as to remove a substantial V-shaped section of stock, as indicated at $a$ in Fig. 8. Successive teeth are similar in shape to the tooth 30 but are gradually widened and somewhat increased in height until they attain the section indicated at 32 in Fig. 4. These teeth remove strips of stock $b$ (Fig. 8).

The succeeding teeth are then progressively widened without increase of height to the tooth section shown at 33 in Fig. 5. Each successive tooth removes a narrow strip of material $c$ at each side of the cut until the cut is finally of full width but of slightly less than finished depth. A series of full width teeth 34 (Fig. 6) are then provided, increasing slightly in height up to the full teeth 35 (Fig. 2) at which point the opening is of full width and depth. The teeth 34 each remove a thin section of material $d$ from the bottom of the opening. The teeth 35, being of uniform section, act to clear the hole.

It will thus be evident that all of the teeth cut substantially below the original surface of the work and that narrow strips of material are removed from the opposite sides of the cut which balance the lateral thrust. I also avoid the clogging of the tool which occurs when attempting to remove substantial layers of material from the full width of the cut.

In Figs. 9 to 13 I have shown a broach designed for enlarging a round cored hole into a square cut opening. In this case, the first tooth 40 (Fig. 11) removes a narrow strip of material $e$ at four equally spaced points in the periphery of the cored circle, each corner of the tooth cutting substantially below the scale or chilled surface.

Successive teeth up to the tooth 41 are of substantially the same square section but are increased in height at the corners, removing successive strips of material *f* as indicated in Fig. 14. The teeth are then gradually widened from the tooth section 41 to the tooth section 42 (Fig. 13), each successive tooth removing strips of material *g* (Fig. 14) until the full size of the desired opening is attained, after which additional full size square teeth 42 finish the opening and provide a smooth surface thereon.

In Figs. 15 to 19 a very similar broach is provided for broaching a square hole from a smaller cored square opening. The teeth from the tooth 50 (Fig. 17) to the tooth 51 (Fig. 18) remove successive layers *k* from spaced points at the sides of the square cored opening, and successive teeth from the tooth 51 to the tooth 52 remove strips *l* from the corners of the opening until the desired square opening is attained, after which finishing teeth (not shown) smooth up and accurately size the opening.

With each form of my improved broach it will be seen that each tooth removes strips of material which are relatively narrow but of substantial thickness, so that the stock is removed quickly and easily and with much less strain on the broach than when successive thin cuts over the entire surface of the opening are taken.

While I have shown square broaches for purposes of illustration, my invention is applicable to the broaching of holes of many other cross sections. It will also be evident that additional changes and modifications can be made in my invention without departing from the spirit and scope of the invention as set forth in the claims and I do not wish to be otherwise limited to the details herein disclosed but what I claim is:—

1. A broach having a series of successive teeth of substantially the same height and each having spaced cutting edge portions disposed at acute angles to the finished surface of the opening formed by the broach, thereby to produce a relatively narrow cut of substantially the full depth of the opening to be formed.

2. A broach having a series of successive teeth of substantially the same height and each having spaced cutting edge portions disposed at acute angles to the finished surface of the opening formed by the broach, thereby to produce a relatively narrow cut of substantially the full depth of the opening to be formed the angularly disposed cutting portions of successive teeth being increasingly spaced apart on the respective teeth.

3. A broach having teeth effective to remove successive narrow strips of material of substantial thickness to thereby produce a relatively narrow cut of substantially the full depth of the opening to be formed and having additional teeth effective to remove successive angularly disposed strips at each side of said narrow cut, each strip extending substantially the full depth of the cut.

4. A broach for producing square holes having a series of teeth gradually increasing in height and approaching a square section with a diagonal substantially equal to a side of the finished hole to be produced, and an additional series of teeth increasing progressively in effective cutting width but not in height to a square tooth substantially equal in section to the finished hole, said latter square tooth being disposed at 45° to the first square section tooth.

5. The combination in a broach as set forth in claim 4 in which each of the teeth of the second series are effective to remove successive narrow strips of material of substantial thickness from the sides of the desired square opening.

6. A broach having a series of cutting teeth, the first tooth having beveled cutting corners and successive teeth being similar in section to said first tooth, but with reduced bevels at the corners, and a further series of teeth increasing in size by successive building up of the sides of the tooth sections while maintaining the tooth height substantially unchanged until a square tooth is produced with its diagonal at 45° to the diagonal of the teeth of the first series and with its cutting edge substantially equal in length to the length of said first diagonal.

In testimony whereof I have hereunto affixed my signature.

DONALD H. WEST.